United States Patent [19]

Carpenter et al.

[11] Patent Number: 5,812,718
[45] Date of Patent: Sep. 22, 1998

[54] METHOD FOR CONNECTING OPTICAL FIBERS AND THE INTERCONNECTION

[75] Inventors: James B. Carpenter, Austin, Tex.; Gordon D. Henson, Lake Elmo; Michael A. Meis, Stillwater, both of Minn.; Richard A. Patterson, Georgetown, Tex.

[73] Assignee: Minnesota Mining and Manufacturing Company, St. Paul, Minn.

[21] Appl. No.: 622,228

[22] Filed: Mar. 27, 1996

[51] Int. Cl.$^6$ .......................................................... G02B 6/38
[52] U.S. Cl. .................................. 385/97; 385/98; 385/99; 385/38
[58] Field of Search ................................ 385/95–99, 67, 385/68, 134, 135; 65/407

[56] References Cited

U.S. PATENT DOCUMENTS

| | | | |
|---|---|---|---|
| 4,729,625 | 3/1988 | Lascoe et al. | 385/99 |
| 4,730,892 | 3/1988 | Anderson et al. | 350/96.21 |
| 4,824,197 | 4/1989 | Patterson | 350/96.21 |
| 4,973,126 | 11/1990 | Degani et al. | 350/96.21 |
| 5,048,920 | 9/1991 | Newell | 385/55 |
| 5,102,212 | 4/1992 | Patterson | 385/98 |
| 5,121,455 | 6/1992 | Palecek | 385/69 |
| 5,150,440 | 9/1992 | Booth | 385/49 |
| 5,159,653 | 10/1992 | Carpenter et al. | 385/95 |
| 5,189,717 | 2/1993 | Larson et al. | 385/95 |
| 5,337,390 | 8/1994 | Henson et al. | 385/81 |
| 5,351,327 | 9/1994 | Lurie et al. | 385/78 |
| 5,381,498 | 1/1995 | Bylander | 385/83 |
| 5,414,790 | 5/1995 | Lee et al. | 385/139 |
| 5,425,119 | 6/1995 | Lee et al. | 385/86 |
| 5,452,386 | 9/1995 | van Woesik | 385/72 |

FOREIGN PATENT DOCUMENTS

| | | | |
|---|---|---|---|
| 0 025 703 | 3/1981 | European Pat. Off. | G02B 7/26 |
| 0 029 383 | 5/1981 | European Pat. Off. | G02B 7/26 |
| 0 348 056 | 12/1989 | European Pat. Off. | G02B 6/38 |
| 0 524 079A1 | 1/1993 | European Pat. Off. | G02B 6/38 |
| 0 122 169 | 10/1994 | European Pat. Off. | G02B 7/26 |
| PCT/US85/00800 | 12/1985 | WIPO | G02B 7/26 |
| WO 95/07794 | 3/1995 | WIPO | B24B 19/22 |

OTHER PUBLICATIONS

Bellcore Technical Reference entitled "Generic Requirements for Single–Mode Fiber Splicing Systems," Issue 2, Jun. 1992, P.O. Box 1910, Morristown, NJ 07962–1910.

Ntt Opto–Electronics Laboratories article "Optical Fiber Connection Realizing Over 60 dB Return Loss with Fibe Physical Contact," by M. Kobayashi, S. Iwano, R. Nagase, and S. Mitachi, 1995, Japan.

Patent Abstracts of Japan No. 04146403; published May 20, 1992; application date Aug. 10, 1990; "Optical Connector Holding Device" by Furukawa Electric Co. Ltd. Intl. Class.

*Primary Examiner*—John Ngo
*Attorney, Agent, or Firm*—Gerald F. Chernivec

[57] ABSTRACT

A mechanical optical fiber splice which does not employ any gel material with a matching refractive index, wherein the fiber ends are prepared for intimate axial compressive contact and the fiber end faces are maintained in the splice element in optically aligned intimate contact under axial compression, as the result of heating, elastic deformation or plastic deformation of the splice element.

29 Claims, 4 Drawing Sheets

METHOD FOR CONNECTING OPTICAL FIBERS AND THE INTERCONNECTION

BACKGROUND OF THE INVENTION

1. Field of the Invention

This invention relates to an improved method for the interconnection of optical fibers and in one aspect relates to a new "dry," i.e. gel-less, mechanical optical fiber interconnection where the fiber ends are optically aligned and are pressed together and maintained under axial compression by the splicing element.

2. Description of the Prior Art

Optical fiber splices are well known and the art is becoming crowded with elements for aligning the fiber ends optically and holding the same in alignment. Cleaved fiber ends are used in most mechanical splices currently available. These splices contain a coupling medium, usually a gel or oil, that has the same index of refraction as the core of the fiber. This index matching material is used to fill the gap between the pair of fiber end faces which are to be spliced.

Prior art showing a splice element of the type used in the present invention is disclosed in U.S. Pat. Nos. 4,824,197 and 5,159,653.

Mechanical splices all contain the index matching gel materials. Some mechanical splices have a problem with temperature cycling due to the index of refraction of these materials changing at varying temperatures, which result in fluctuations of the optical signal, mainly return loss increases. Therefore, the mechanical splices, not using angled cleaving on the fiber ends, presented a problem, first, in not always meeting temperature cycling specifications and, second, needing the index matching materials. However, the mechanical splices are easier for the technician in the field to complete. The improvement of the mechanical splices in a manner to render them acceptable and readily comparable to the fusion splices is contemplated by the present invention. Existing techniques for preparing the fiber ends for connection are employed in the present invention to produce mechanical, dry, i.e. gel-less splices.

SUMMARY OF THE INVENTION

The present invention provides a new and improved process for splicing optical fibers. The process comprises the steps of preparing the ends of the fibers to be spliced for intimate axial compressive contact between the cores, entering the fiber ends into the opposite ends of a fiber passageway in a fiber splice element, and placing a compressive force at the interface of the fiber ends to retain intimate axial contact of the fiber cores throughout temperature cycling between 0° and 40° C. This compressive contact is afforded by applying axial compressive forces onto the fibers when in the splice element passageway prior to actuation of the element, placing a stress onto the splice element prior to actuation of the element such that when the stress is removed the splice element will apply an axial compressive force on the fiber ends, or applying deforming pressure to the element after actuation to apply a compressive stress to the ends of the optical fibers to maintain them in intimate axial compressive contact throughout the desired temperature ranges. Stress can be applied to the splice element by heating the element, bending or stretching the element along the fiber passageway prior to the insertion of the fiber ends into the splice element and actuating the same. Also, the compressive force to the fiber end interface may result by applying a force to deform the element and forcing the fiber ends into intimate pressure contact. Further, combinations of these procedures are also contemplated, i.e. heating the splice element and placing the fiber ends in the element under spring or mechanically applied compression contact.

Heating the metallic element to a temperature between 100° and 120° C. prior to actuation of the splice element, which actuation serves to align and bind the fiber ends and effectively holds the fiber ends in aligned, intimate axial pressure contact with each other when the splice is returned to room temperature. The amount of heat applied exceeds the temperature used in the temperature cycling tests of the Bellcore specification, as used generally industry wide and published by Bellcore (Bell Communications Research, Morristown, N.J.) Document TA-NWT-000765 and GR-765.

After placing the fiber ends in intimate contact in the splice element of a Fibrlok™ Splice, force can be applied to the element to distort or stress the material and cause the material to apply compressive stress on the fibers to force them into compressive contact.

The interconnection of the present invention is an optical splice between two single mode optical fibers comprising a splice element having a longitudinal passageway for receiving the ends of the fibers approximate the midpoint of the passageway, and the fiber ends being placed in axial compression against each other free of any index matching material.

The splice of the present invention contemplates splicing two optical fiber ends which have been positioned and clamped within a metal splice element. Through one of a variety of methods, the fiber ends are placed and held in optically aligned intimate axial compression against each other. The splice of the present invention is free of any index matching material.

BRIEF DESCRIPTION OF THE DRAWINGS

The present invention will be further described with reference to the accompanying drawing wherein.

DESCRIPTION OF THE PREFERRED EMBODIMENT

Figure 1:
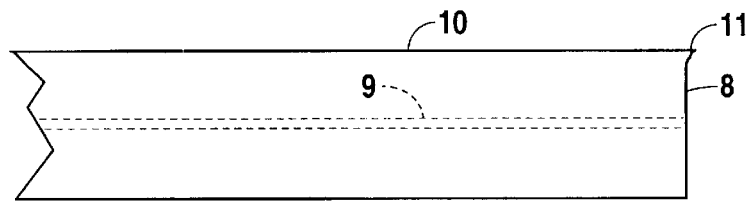
FIG. 1 is a side elevational view of an end of an optical fiber that has been cleaved.
Figure 2:
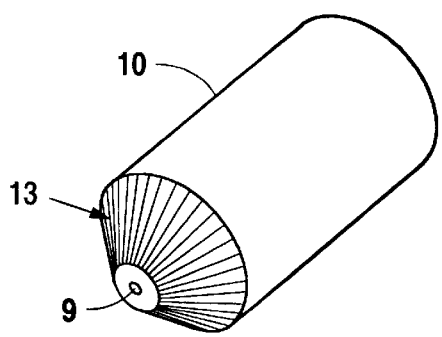
FIG. 2 is a perspective view of a fiber end that has been cleaved and beveled.
Figure 3:
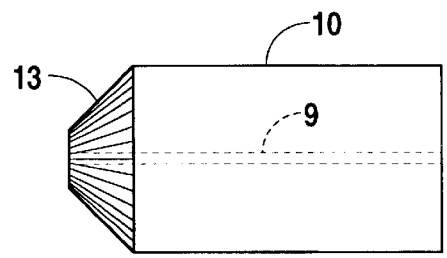
FIG. 3 is a side elevational view of the cleaved and beveled fiber end of FIG. 2.

The present invention provides an improved mechanical splice and the novel method of obtaining the splice. In the drawing, incorporated to illustrate the novel features of the present invention, like reference numerals are used to identify like parts throughout the several views.

While optical fiber ends can be polished, it is time consuming and difficult to be precise, cleaved fiber ends are used in most mechanical splice configurations currently available. Cleaving is a practice of first scoring or nicking a very small point on the outer periphery of the cladding of an optical glass fiber, which reduces its mechanical strength at that point. The later application of a tensile or bending load along the length of the fiber where the score defect was made causes the fiber to break generally perpendicular to the fiber axis. The cleaving procedure creates the fiber end face 8, see FIG. 1, which possesses the most easily obtainable defect free surface mechanically obtainable for the fiber core 9. Most mechanical splice configurations currently available, contain a coupling medium, usually a gel or oil, that possesses the same index of refraction as the core 9 of the fiber 10. This index matching material is used to fill the gap at the interface between the pair of fiber end faces 8, see FIG. 4, which are spliced. This gap is caused by a cleft or protrusion 11 which can occur at the point directly opposite the score mark or nick.

This condition, as well as other undesirable conditions, usually are caused by inherent problems within the cleaving procedure. Many different tools are described in prior art which perform the perpendicular cleaving operation with varying degrees of accuracy. Accuracy is measured with a micro-interferometer, which determines both the flatness and the angularity of the end.

Figure 5:
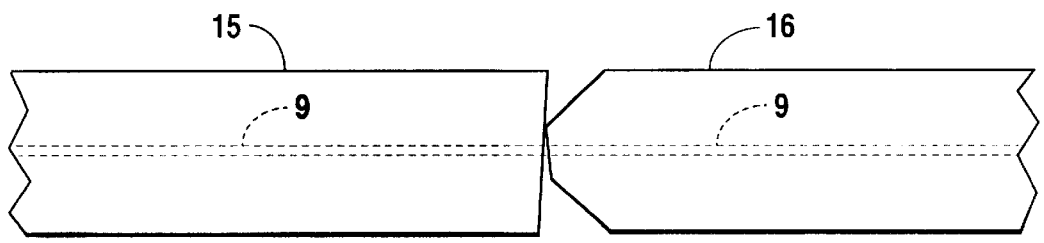
FIG. 5 is a side elevational view of a pair of fibers pressed together where the end of one fiber has been cleaved and the end of the other fiber has been cleaved and beveled and the ends have been placed in contact.

Undesirable features caused by the cleaving process can be removed by grinding a bevel on the end of the fiber. The conical geometry of the bevel 13 which has been ground on the end of a single mode fiber are easily generated by using existing tools which are operated both manually and automatically. One such tool for bevel grinding is described in publication No. WO 95/07794, published 23 Mar. 1995, of Minnesota Mining and Manufacturing Company, 3M, St. Paul, Minn. A bevel angle or included angle, of the cone shaped end portion 13, of between 40 and 160 degrees can be easily obtained by making simple adjustments to the tools. The change in angle, provides a change in the end face diameters. The fiber length is easily set with a simple fixture, and once set, the angles generated are consistent from fiber to fiber, within a range window of 10 degrees. The end face area or its diameter is determined by the amount of material removed from the end of the fiber. On the automatic bevel tool, this is controlled by the amount of time the fiber is ground. The more time spent results in a smaller end face diameter. On the manual bevel tool, this is controlled by the number of revolutions the fiber is rotated against the abrasive media, more revolutions results in a smaller end face diameter. Control of the end face diameter is very consistent once the tool parameters have been set. End face diameter can usually be maintained within + or −0.0002 inch, over many beveling cycles before the abrasive media requires changing due to wear. The surface area of the end face of a fiber is greatly reduced by beveling the end of a fiber. FIG. 5 illustrates this reduction by comparing a cleaved fiber 15 next to a cleaved and beveled fiber 16. By beveling the end of the fiber to 0.0015 inch, which was the diameter used most during splice testing, the surface area of the fiber end face is reduced by 90%. The imperfections from the cleaving operation located around the periphery of the end face have been removed. The edge of the end face has been strengthened, due to increasing the angles between the end face and the side of the fiber. The angle used most during splice testing was a 90 degree included angle, or 45 degrees from the axis of the fiber.

Figure 4:
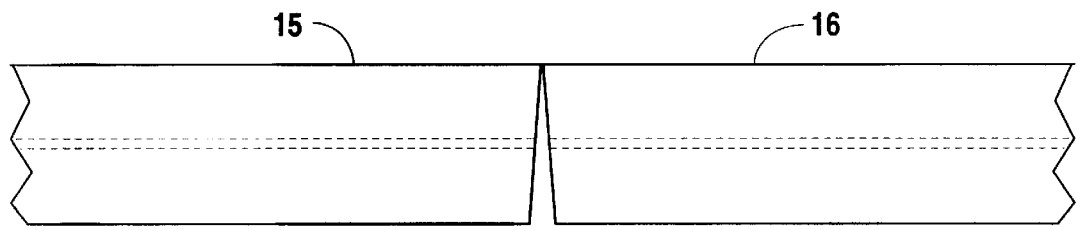
FIG. 4 is a side elevational view of a pair of cleaved fiber ends placed in contact.

The reduction in surface area is important for two reasons. The first involves the fiber cleaving operation which rarely yields a perfectly flat perpendicular end face. An angle of up to 1½ degrees from perpendicular to the fiber axis, usually occurs on the end face. If a pair of fibers 15 and 16 are mated so that both have angled end faces, a gap is created between the fiber cores. FIG. 4, illustrates this condition. By beveling just one of the fibers, fiber 16, keeping the angular relationship intact, the gap is reduced by 66% using a 0.0015 inch (0.04 mm) diameter end face on fiber 16.

The second reason involves the amount of axial pressure required to elastically deform both fiber end faces to the point that the fiber cores 9 are in intimate contact, and a gap does not exist between them. If pressure on a fiber remains constant, and the surface area of the fiber's end face is reduced, the total pressure experienced at the fiber interface increases. This benefit, i.e., increasing fiber end interface pressure to afford intimate pressure axial contact between the fiber cores, is important. The amount of force that can be transmitted down a length of 250 micron buffer coated fiber all the way to its end face is very small. Using a standard 1.500 inch (38.1 mm) long Fibrlok™ Splice as an example, the fiber is inserted ½ way into the splice, which would be a distance of 0.750 inch (19 mm). This would be the closest point at which the fiber could be gripped by some device in order to transmit force longitudinally to the end face. The diameter of the glass portion of a 250 micron fiber measures 0.005 inch (0.125 mm). This is a poor length to diameter ratio (150 to 1) for the transmission of force. The splice entrance hole is several thousands of an inch larger than the outside diameter of the fiber, to provide clearance, which allows the fiber to bend when put under axial pressure. If this pressure is too great, the fiber buckles, and damage or breakage can occur.

Some of the benefits obtained by cleaving and beveling fibers can be acquired also by polishing the end of a fiber. Undesirable defects caused by cleaving are removed. The face surface area is greatly reduced. Fiber edge strength is usually improved depending on the end face profile that is used. Control of the end face profile is dependant on the equipment and procedures used. Polishing can be obtained by heat polishing or abrasive polishing. Heat polishing means the melting of the fiber surface and abrasive polishing involves the removal of glass with an abrasive media. There are several disadvantages associated with abrasive polishing which leaves scratches in the end face of the fiber. Finer and finer abrasive grits are used to reduce the size and depth of these scratches, improving surface finish, but scratches will always remain. The finer the finish desired, the more polishing steps required, which means more time required.

Optical fiber splices are expected, by most customers, to meet standard Bellcore performance specifications. Limits are prescribed for return loss throughout a temperature range of −40° C. to 80° C. Typical splices, which contain optical index matching materials, display poor return loss at and near these temperature extremes. Intimate contact should be maintained between 0° C. and 40° C. for indoor applications.

Concerns raised with the index matching materials in mechanical splices might find solutions by improving the optical index matching media, or eliminating the optical index matching media. In order to eliminate the optical index matching media, the ends of the fibers must be improved to ensure intimate contact between the end faces. The fiber end preparation procedures previously described yield improved fiber ends that allow intimate axial pressure contact between the end faces and eliminate the need for index matching materials.

To test these improved fiber end faces, Fibrlok™ Splices were made in the factory without the application of index matching gel and/or oil, a "dry" splice. A pair of 125 micron single mode fibers were stripped and cleaved, within 1 degree of being perpendicular. The fibers were then beveled with 90 degree included angles, and 0.0015 inch diameter end faces, similar to the fiber 16 illustrated in FIG. 5. They were cleaned by moistening a lint free cloth with isopropanol, surrounding the fiber with the cloth, pulling it out, and finally making several wipes of the tip of the fiber against the cloth. The fibers were then inserted into the splice using the standard established procedures, and then the splice was actuated.

A Textronics Fibermaster™ OTDR was used to measure splice performance during all tests. Measurements were made by averaging the readings taken from both fibers, one at each end of the splice, for greater accuracy. Several splice samples were made at room temperature, 26 degrees C., and results were similar for all samples. Insertion loss was below −0.2 dB, and return loss, (backreflection), ranged from −20 dB to −45 dB. The splices were put into a temperature cycling chamber and put through a Bellcore patterned temperature test, −40° C. to 80° C. One hour at each temperature with an hour and a half transition time between temperatures. During this test it was noticed that the insertion loss remained stable for all splices, fluctuating less than a tenth of a dB, and the return losses for all splices would increase to the −18 dB range at temperatures above 40° C. Below 0° C., all splices improved from their original room temperature measurements, ranging between −40 dB and −60 dB.

The explanation for these results is as follows. The Fibrlok™ Element is made from aluminum. The thermal coefficient of expansion for aluminum is 0.0000238 per unit length per degree C. That number for glass can be between 0.0000102 and 0.00000005, depending on its chemical composition. Aluminum will therefore expand and contract at a faster rate than glass. The Fibrlok™ element grips the glass fibers upon actuation. The fibers are actually lightly embedded in the elements's surfaces, and no slippage occurs between the fibers and the element. When the test splices were made at room temperature, the fiber ends were placed into light nominal contact with each other, without fiber end face deformation, using the standard splice assembly procedure which uses forces generated from bowing the buffer section of the fiber outside of the splice to ensure fiber end face contact is made inside the splice. When the temperature inside the thermal test chamber increased above the temperature at which the splices were assembled, the aluminum element was expanding at a faster rate than the glass fiber, until all pressure at the fiber interface had been relieved and the fibers started to separate. When the fibers separated, high return losses are measured due to the glass/air/glass interface. This condition reversed itself when the thermal chamber temperature dropped below the splice assembly temperature. As the temperature decreased below room temperature, the aluminum element contracted at a faster rate than the glass fiber, resulting in increased pressure at the fiber interface, reducing and eliminating the glass/air/glass interface yielding lower return loss readings. The return loss pattern remained consistent from one cycle to the next.

These tests lead to the present invention. The present process involves heating a dry Fibrlok™ Splice to a temperature that was higher than the highest temperature that the splice would ever be subjected to, inserting the fibers into the "hot" splice, and actuating it. This should ensure that the fiber end faces are always in intimate contact within the target operating temperatures, which would yield low return losses.

Figure 6:
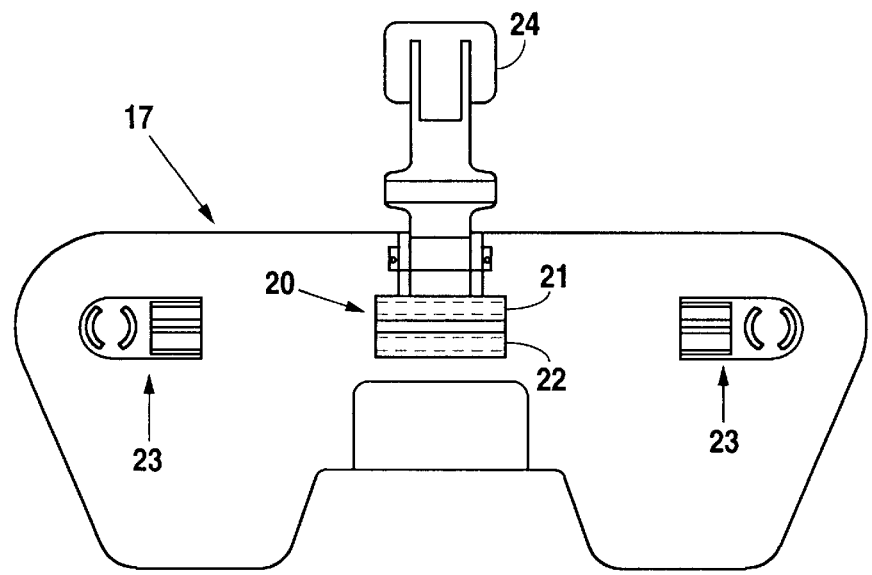
FIG. 6 is a top plan view of a splicing tool for practicing the process of the present invention to obtain the desired mechanical splice of the present invention.

As an example, a commercial Fibrlok™ Splice Actuation Tool 17 was modified as illustrated in FIG. 6 to apply heat to the splice. The plastic splice retention nest was machined off the base of the tool, and replaced by a new nest 20 made from aluminum which housed two ⅛ inch (3.17 mm) diameter by 1 inch (25.4 mm) long, electrically powered, 25 watt cartridge heaters 21 and 22. The heaters were controlled by a Ogden digital control, accurate to +/− 1 degree C. The splice nest was designed to surround as much of the splice as possible without affecting its function, in order to transfer heat to the splice as fast as possible. A thermocouple was placed inside the center of a metallic Fibrlok™ splice element, it was assembled into a splice, and the splice placed into the modified tool. The splice was heated four separate times, from room temperature to 100° C. The average time for the splice element to reach the target temperature was 50 seconds. When the splice was removed from the tool, it required from three to four minutes for the splice element to cool back to room temperature.

The splice was tested and the temperature control for the first splice test was set at 100° C., 20 degrees higher than the highest temperature specified in the Bellcore testing procedure. A dry Fibrlok™ Splice was inserted into the heated aluminum nest and allowed to soak at a temperature of 100° C. for a minute. A pair of fibers were cleaved, within 1 degree, and beveled to an end face diameter of 0.002 inch (0.05 mm). The fibers were inserted into the heated splice, the splice was actuated, allowed to cool, and placed into the temperature testing chamber. The first performance measurements taken at room temperature showed insertion loss was −0.10 dB with a total fluctuation of 0.02 dB. Average return loss was −56.7 dB with a total fluctuation of 3.7 dB. The results indicated stability of the optical signal. The normal buffered fiber restraints 23 and the actuating lever 24 remained on the tool 17.

Figure 7:
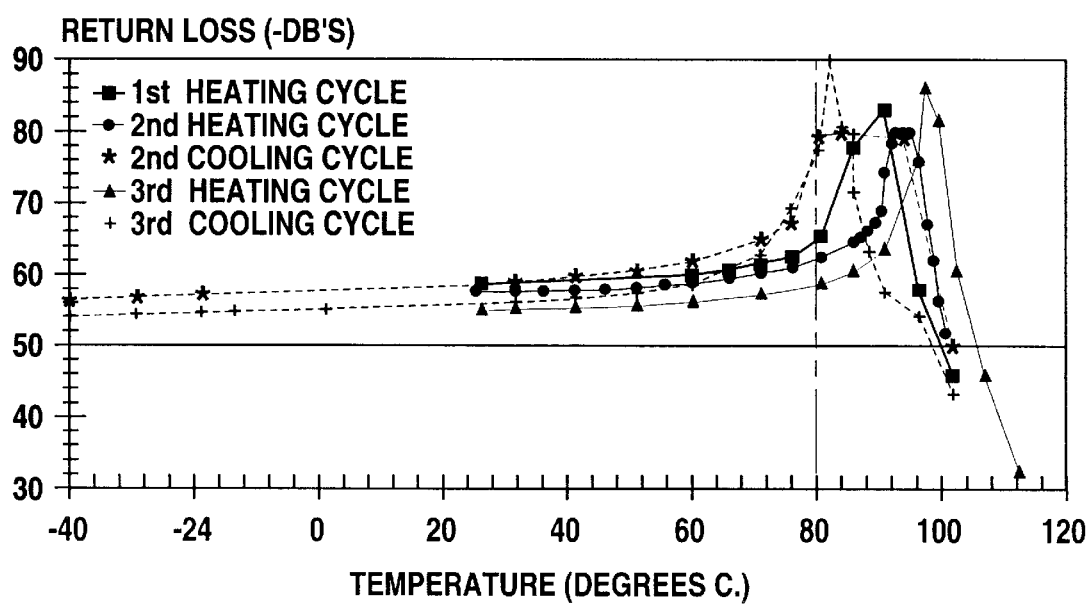
FIG. 7 is a graph illustrating the test data of a splice prepared according to the present invention.

Another splice was prepared and assembled using the same parameters as the previous splice test. A graph illustrating this test data is shown in FIG. 7. The first return loss measurement taken at room temperature was −57.5 dB. The splice was slowly heated back to 100° C., taking measurements every 5° starting at 60° C. The return loss slowly decreased until 80° C. at which point it decreased at a faster rate until it peaked at −83 dB at 90° C. Between 90° C. and 100° C., the return loss rapidly increased, reaching −36 dB at 100° C. The splice was then allowed to cool. A second heating cycle was performed having similar results as the first, except the peak was observed at 94° C. (−93 db). During this cycle, the splice cooling trend was recorded. During cooling, the return loss decreased at a fast rate to a peak of −93 dB at 83° C. It then rapidly increased to −65 dB at 70°, after which, the increase was very slow. The cooling cycle was stopped at −40° C., with a return loss reading of −56.8 dB. A third cycle was performed, and followed the same pattern as the second, with slightly better results. Looking at the graph of FIG. 7, a rapid decrease in return loss is followed immediately by a rapid increase, within approximately a 20° range. The peak, or lowest reading, is the transition point between fiber contact and separation, on the hotter side of the peak. On the colder side, it is theorized that the compressive forces being generated at the fiber interface by the contracting aluminum is causing the glass density to change, which changes its index of refraction. This eventually stabilizes, and the increase in return loss almost flattens out when the temperature was lowered. Note that the optical signal is fairly stable in the Bellcore operating temperature test range of −40° to 80° C.

Figure 8:
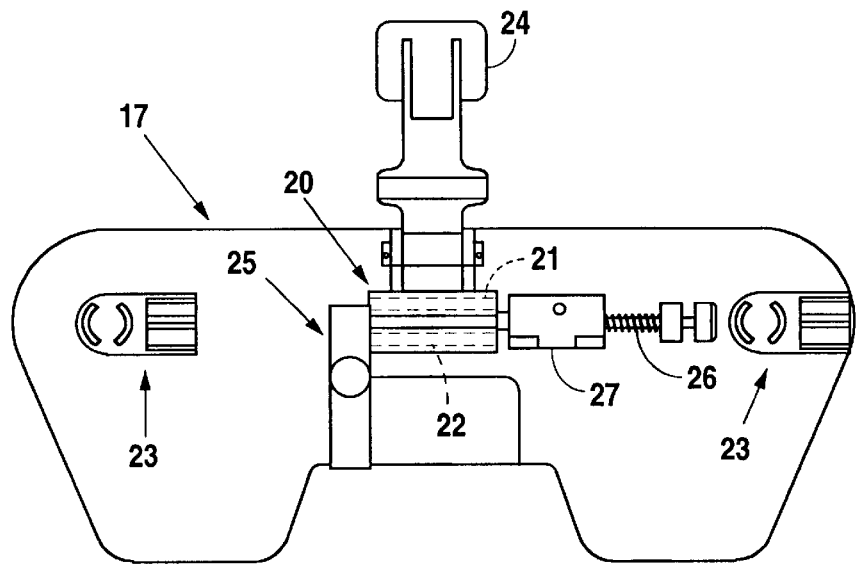
FIG. 8 is a top plan view of a splicing tool incorporating a movable fiber clamp mounted on a ball slide.

A second tool modification is shown in FIG. 8, where a fixed clamping mechanism 25 was attached to the actuating tool 17 at the left side of the splice nest 20, and positioned to grip the fiber immediately as it exited the splice. A second fiber clamp 26 was mounted at the right side of the splice nest 20 on a linear ball slide with approximately 0.1 inch (2.5 mm) travel. A compression spring 28 was in contact with the ball slide, and located opposite the splice rest 20. A screw 29 was mounted on the tool base and was used for adjusting the force that the compression spring 28 placed on the fiber via the ball slide.

A dry Fibrlok™ Splice was placed into the tool, and a pair of fibers were prepared having a cleave angle of less than 1 degree, and bevel diameters of 0.0015 inch (0.038 mm) on each fiber end. The tool was heated to 100° C. One of the fibers was placed into the left hand side of the splice approximately half way, and then clamped. The second fiber was placed into the right hand side of the splice until it made contact with the first fiber, and was then clamped. The force adjustment screw was rotated until approximately 0.3 pounds (1.3 Newtons) of compressive force was generated, and then the splice was actuated to clamp the fiber ends. Both clamps were then released. Return loss measured −56.9 dB, with the splice still at 100° C. in the tool. The splice was then allowed to cool. Measurements were taken during this cooling cycle. Results were posted. The splice was cooled to −40° C. Return loss had increased to −51.8 dB while insertion loss remained at −0.11 dB. The splice was then heated, with measurements being taken every 5°. The transition zone was reached at 151° C. where a measurement of −80.3 dB was recorded. Beyond this temperature the return loss increased rapidly. The splice was again cooled from a temperature of 165° C. The transition zone was reached at 134° C. with a measurement of −80.3 dB, after which, return loss rapidly increased for a 15 to 20 degree period and then increases were extremely slow.

The added axial pressure of the compression spring fiber preloading increased the temperature at which the fibers separated, while keeping the return losses at the colder temperatures comparable to previous tests. The optical signal remained fairly stable within the Bellcore operating temperature test range.

A series of tests were performed involving assembling splices using the compression spring preload method, without the use of heat on the splice element. A dry Fibrlok™ Splice was placed into the tool nest which remained at room temperature. A pair of fibers were prepared with less than 1° cleave angle, and bevel diameters of 0.0015 inch (0.038 mm). The fibers were gripped in the clamps like the previous test. Approximately 0.2 pound (0.9 Newtons) of compressive force was applied to the right side fiber, then the splice was actuated and all clamping forces were removed. The fiber end face transition zone for heating was between 129° and 134° C. The transition zone for cooling was between 114° and 120° C. After the first heating cycle, all remaining cycle patterns were very consistent with one another inside of the Bellcore operating temperature test range.

Figure 9:
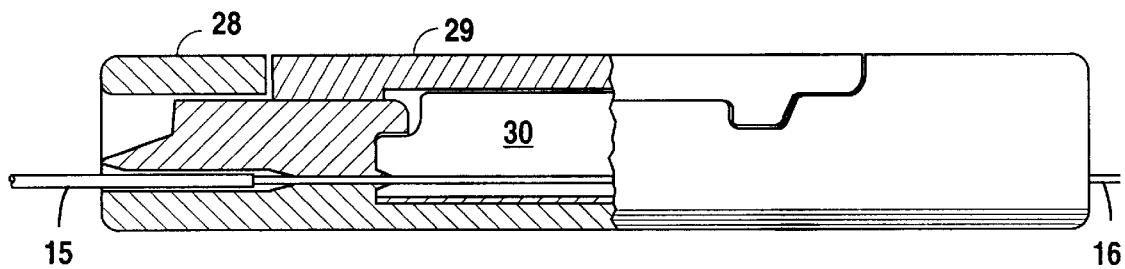
FIG. 9 is a longitudinal partial sectional view of a splice where the splice element has been actuated according to the present invention.

The body 28 and cap 29 of the Fibrlok™ Splice shown in FIG. 9 is formed of a liquid crystal polymer with 30% glass loading and can withstand the temperatures described above without deleterious effect and the splice element 30 is formed of aluminum.

Figure 10:
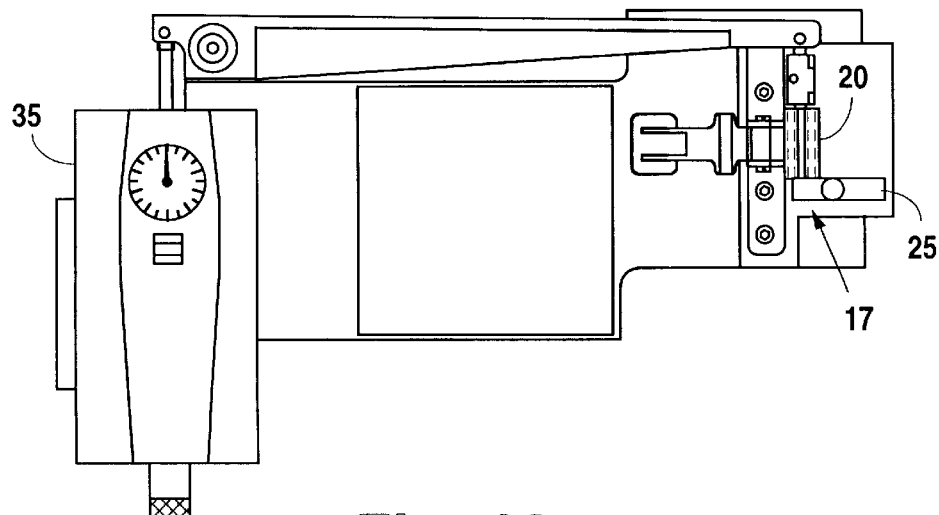
FIG. 10 is a top plan view of a modified splicing tool having a mechanism for applying various measurable compressive force on the fibers to apply compression on the fiber ends in a splice element.

A further modification of the actuation tool 17 is shown in FIG. 10. The modification was the addition of a force gauge 35 placed next to the left side of the splice nest 20 opposite to the fixed fiber clamping tool 25. The force gauge measurement probe pushed on one end of a pivot arm which in turn pushed on the moveable fiber clamp. The pivot was positioned in such a manner to reduce the forces generated by the force gauge/linear slide assembly by a ratio of 10 to 1. This will improve the accuracy of the force measurement on the movable fiber in making a splice.

Four dry Fibrlok™ Splices were assembled using the new actuation tool. Fiber end face axial compressive preload was applied with the force gauge/linear slide assembly. The heated splice nest 20 was not used, heat was not applied. Two of the four splices had a beveled fiber to beveled fiber interface, while the remaining two had a beveled fiber to a cleaved fiber interface. The four completed splices were placed into a thermal temperature cycling chamber for a long duration Bellcore patterned temperature cycling test. The cycle pattern was accelerated to a four hour complete cycle, starting with: (1) ½ hour at −40° C., (2) 1½ hours transition time from −40° C. to 80° C., (3) ½ hour at 80° C., (4) 1½ hours transition time from 80° C. to −40° C., continuously repeating. The purpose of this test was to verify that dry fiber interfaces could survive many repetitions of the Bellcore temperature test pattern, and to investigate consistency of the optical signal from start to finish. Four splices assembled with this fixture endured 530 complete cycles, taking approximately 89 days. Measurements were made with the OTDR by averaging the readings taken from both fibers, one at each end of the splice, for greater accuracy.

Splices 1 and 2 had a beveled fiber to beveled fiber interface, while splices 3 and 4 had a beveled fiber to a cleaved fiber interface. Splice 1 possessed 0.0015 inch (0.038 mm) diameter end faces and was assembled at 0.22 pounds (0.9 Newtons) of fiber preload force. Total return loss variation was 9.5 dB, while insertion loss variation was 0.05 dB. Splice 2 possessed 0.0015 inch (0.038 mm) diameter end faces and was assembled at 0.2 pound (0.89 Newtons) of fiber preload force. The total return loss variation was 14 dB, while insertion loss variation was 0.05 dB. Splice 3 possessed one 0.0015 inch (0.038 mm) diameter end face and was assembled at 0.3 pound (1.33 Newtons) of fiber preload force. Total return loss variation was 31 dB, while insertion loss variation was 0.11 dB. Splice 4 possessed one 0.001 inch (0.025 mm) diameter end face and was assembled at 0.1 pound (0.445 Newtons) of fiber preload force. Total loss variation was 6 dB, while insertion loss variation was 0.05 dB. Except for splice 3, the results demonstrated good, stable optical signals with no change in performance from beginning of the test, to its end. Splice 3 performed poorly at the higher temperatures. Upon closer examination with the OTDR, it was discovered that at 80° C. the fiber end face transition zone had been reached. During some of the cycles, the end faces would stay in contact yielding excellent return loss, while in others they would separate towards the end of the 80° C. time period, yielding poorer return loss.

Using the actuation tool illustrated by FIG. 10 and a dry Fibrlok™ Splice, a test was performed to correlate the effect of end face preload force and return loss. A pair of 250 um buffer diameter single mode fibers were cleaved and beveled to an end face diameter of 0.0015 inch, with a cleave angle of less than one degree. Both fibers were inserted into the splice, and each was clamped in its respective holder. The force was increased from zero (0) pound to the point at which the fiber outside the splice started to buckle. This usually occurred at around 0.3 pound (1.3 Newtons). Increments as low as several thousandths of a pound were used at the beginning, where several hundredths of a pound (a tenth of a Newton or less) worked well during the latter stages of the test. Several trials were made with each splice and fiber pair, and several tests were conducted using different fiber pairs. The results from the tests were substantially the same. The lowest return losses usually occurred between 0.012 and 0.026 pound (0.05 and 0.1 Newton).

If a Fibrlok™ Splice, splice element is made from a material other than aluminum, having a coefficient of thermal expansion closer to glass, return loss performance should improve, using the fiber compression process prior to actuation of the splice. There is not a wide selection of materials available that are as ductile and cost effective as aluminum. Copper was close, and was chosen to test this theory. The coefficient of thermal expansion for copper is 0.0000141 per unit length per degree C., as compared to aluminum which is 0.0000238. Several elements were made, and a dry copper splice was assembled. A pair of fibers were cleaved and beveled to a 0.0017 inch (0.043 mm) diameter end face. The fiber end faces were preloaded to 0.25 pounds (1.1 Newton) and the splice was actuated.

The test showed the performance was surprisingly good considering the use of copper. Return loss performance improved after the first heating cycle by almost 10 dB, and remained at that level for the remaining cycles. The curve from the transition point towards the cooler temperatures appears flatter compared to aluminum elements, possibly due to the difference in expansion rates. The curve from the transition point towards warmer temperatures follows the same rapid increase as the aluminum element. The transition point itself was within the same temperature range as previous tests using aluminum elements.

Optical fibers that are prepared using a quality cleaving process and the application of bevel geometry on one or both fibers, coupled with the generation of compressive forces at the fiber interface by the use of either heat or pressure, or both, inside of a "dry," i.e. gel-less, Fibrlok™ Splice, can yield stable return loss and insertion loss performance, equivalent to fusion splices, during Bellcore temperature cycling tests without the use of index matching materials.

Alternative methods of placing stress on the splice element to maintain axial compressive forces between the ends of the fibers upon completion of the splice are discussed. One such method is to apply compression to the ends of the actuated splice sufficient to cause internal plastic deformation of the metal splice element from the ends toward the fiber interface. The splice element will thus apply and maintain the compressive forces at the interface throughout the subsequent heating and cooling environment.

Figure 11:
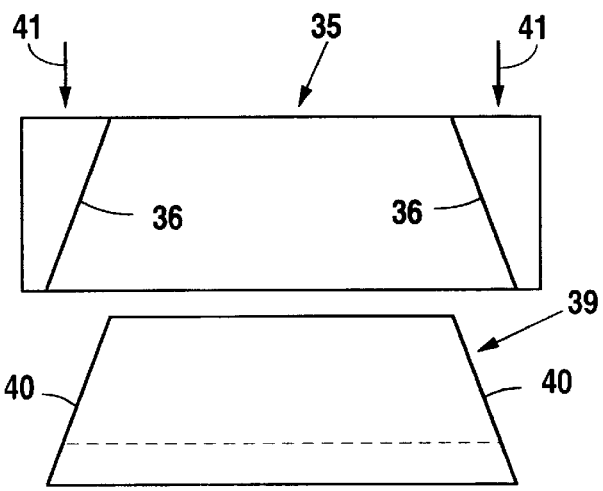
FIG. 11 is a front elevational view illustrating a modified splice element and a modified nest tool for stretching the splice element prior to actuation to place and maintain a compressive axial force on the fibers at the fiber interface.
Figure 12:
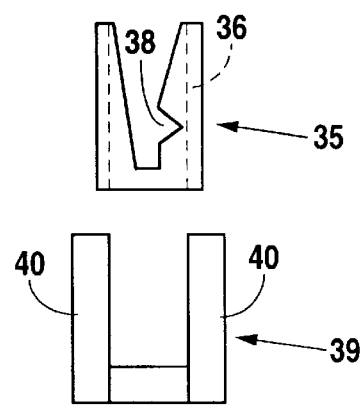
FIG. 12 is an end view of the splice element and tool of FIG. 11.

Further, FIG. 11 diagrammatically illustrates a modified splice element 35 comparable to the Fibrlok™ splice element, modified to remove material along the sides and form cam surfaces 36 adjacent each end, which cam surfaces are angularly related to the axis of the fiber passageway 38, see FIG. 12. The actuation tool is modified to have a spreading cam 39 formed thereon. The spreading cam 39 is formed with cam surfaces 40 which are formed to engage the cam surfaces 36 to stretch the splice element 35 upon the application of force on the splice element 35 as illustrated by the arrows 41. The length of the elastic deformation of the splice element, in the longitudinal direction, is controlled by the distance the splice element is forced down upon the spreading cam 39. Alternately, the cam surfaces on the element could be designed to shear at a selected force which would result in the desired extension. After insertion of prepared fiber ends, the element is closed to clamp the fibers in place, and the spreading force placed previously on the element is removed. With the removal of the spreading force, stored energy in the element causes a contraction of the element 35, placing the opposed optically aligned ends of the fibers in longitudinal compression or intimate axial contact.

FIG. 12 diagrammatically shows the end view of the modified element 36 and the spreading cam 39.

Figure 13:
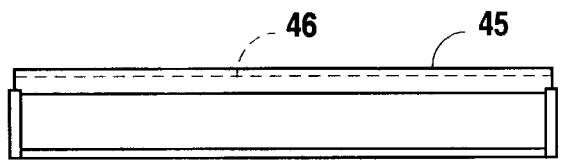
FIG. 13 is a front elevational view of a further embodiment of a modified splice element positioned on a housing of a splicing tool for insertion of the fiber ends.
Figure 14:
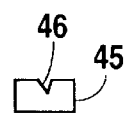
FIG. 14 is an end view of the splice element of FIG. 13.
Figure 15:
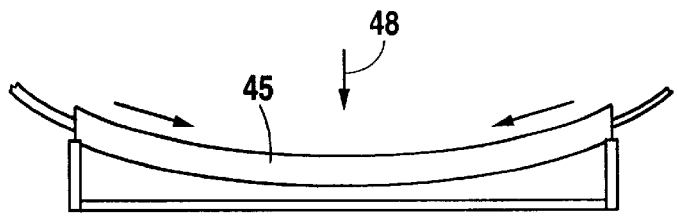
FIG. 15 is a sketch of the splice element having a bending pressure applied to place compressive stress onto the fiber ends.

FIGS. 13 and 14 illustrate a further modification wherein a splice element 45 is rectangular having a longitudinal V-groove 46 along the upper surface and the ends of the fibers are placed in the V-groove in firm contact near the longitudinal center of the splice element 45 and of the V-groove 46. The fibers are then firmly secured at the opposite ends of the longitudinal groove. While fixing the position of the ends of the element within a housing, a force 48, see FIG. 15, is applied normal to the top surface of the element 45 in order to induce bending in the element. The bending force 48 applied should be sufficient to cause plastic deformation of the element 45 into the shape of an arc, with the secured fibers on the inside surface. As a result of the plastic deformation of the element, material along the bottom surface of the element is elongated, while material along the top surface, which also contains the V-groove holding the fibers, is compressed. It is this differential stress to the element 45 and the compression of the material along the top surface which places the fiber end faces in axial, i.e. longitudinal compression. Plastic deformation of the element maintains the compressive force on the fiber ends at the interface.

Having thus described the invention it is to be appreciated that modifications may be made in material or in some dimensions and not depart from the spirit of the invention as defined in the appended claims.

We claim:

1. A process for splicing optical fibers having light transmitting cores comprising the steps of:

preparing the ends of the fibers to be spliced in abutting relationship without an index matching material between the ends of the fibers, providing a fiber splice element having a fiber alignment passageway with two opposite ends, entering a fiber end into each of the opposite ends of said fiber alignment passageway until the fiber ends are in contact with each other, and actuating the fiber splice element to clamp the optical fibers and grip the fiber ends so as to maintain an axial compressive force at the interface of said fiber ends in the fiber splice element to retain intimate contact of the fiber cores throughout temperature cycling between 0 degrees and 40 degrees C.

2. The process of claim 1 further comprising the step of applying said axial compressive force to said fibers prior to actuating the fiber splice element.

3. The process of claim 1 further comprising the step of heating the fiber splice element above 80° C. prior to actuating the fiber splice element and then cooling the fiber splice element after actuation to produce said axial compressive force.

4. The process of claim 1 further comprising the step of stretching the fiber splice element to elastically deform the fiber splice element prior to actuation and then releasing the fiber splice element after actuation to produce said axial compressive force.

5. The process of claim 1 further comprising the step of elastically deforming the fiber splice element longitudinally of the fiber aligning passageway prior to actuating the fiber splice element to clamp the fiber ends therein.

6. The process of claim 1 further comprising the step of plastic deformation of the fiber splice element after actuation to place said axial compressive force on the fiber ends at the interface.

7. A method of splicing the ends of optical fibers comprising the steps of:

cleaving the ends of the fibers to be spliced, beveling the cleaved end of at least one of the fibers, providing a fiber splice element having a fiber alignment passageway, placing the ends of the beveled fibers into abutting relationship in said fiber alignment passageway of the fiber splice element without an index matching material between the ends of the fibers, placing the fiber splice element under physical stress, closing the fiber splice element to clamp onto the optical fibers and grip the ends of the fibers while the fiber splice element is under said stress, and allowing the fiber splice element to return to normal condition, thereby placing a compressive load upon the opposed abutting fiber ends.

8. The process of claim 7 wherein said step of placing the fiber splice element under physical stress comprises heating of the fiber splice element.

9. The process of claim 7 wherein said step of placing the fiber splice element under physical stress comprises elastically stretching said fiber splice element.

10. A process for splicing optical fibers comprising the steps of:

providing a fiber splice element formed of metal and having a fiber passageway with opposite ends, entering an end of each of the fibers to be spliced into opposite ends of the fiber passageway in the fiber splice element until the ends are in contact with each other near the center of the fiber splice element, heating said metal fiber splice element to a temperature above 80° C., and actuating said fiber splice element to clamp onto the fiber ends for maintaining the fiber ends in intimate contact while cooling the fiber splice element, whereby an axial compressive force is placed on and maintained at the interface between the ends of the fibers.

11. The process of claim 10 further comprising the step of cleaving the ends of the fibers to be spliced.

12. The process of claim 10 further comprising the steps of cleaving the ends of the fibers to be spliced and beveling the end of at least one of said fibers to form a chamfer or conical end on said at least one fiber.

13. The process of claim 10 further comprising the step of placing the fiber ends in compressive contact in the fiber splice element prior to actuating the fiber splice element.

14. An optical splice between two single mode optical fibers comprising:

a splice element having a longitudinal passageway for receiving the ends of said fibers approximate the midpoint of said passageway, and said splice element actuatable to grip the optical fibers and maintain said fiber ends in axial compression against each other at an interface free of any index matching material between the fiber ends.

15. The splice of claim 14 wherein the end of at least one of said optical fibers is cleaved and beveled.

16. The splice of claim 14 wherein the fiber ends are polished.

17. The splice of claim 14 wherein said ends of said fibers are maintained in intimate contact at any temperature between 0° and 40° C. due to said axial compression of said fiber ends.

18. The splice of claim 14 wherein said axial compression between the ends of said fibers is the result of thermal contraction of said splice element after insertion of said ends into said passageway and actuation of said splice element to grip said ends within said passageway.

19. The splice of claim 14 wherein said fiber ends are in intimate contact at the interface resulting from plastic deformation of the splice element and displacement of the splice element material between the ends thereof.

20. The splice of claim 14 wherein at least one of said end faces has a diameter between 0.001 inch and about 0.002 inch at the interface.

21. The splice of claim 14 wherein said splice element is bent and deformed to place the passageway in compression and the fiber ends in axial compression.

22. The splice of claim 18 wherein the splice element is metallic.

23. The splice of claim 14 wherein the splice element is formed of metal.

24. The splice of claim 23 wherein the metal is aluminum.

25. The splice of claim 24 wherein said fiber ends are placed in contact under an axial compressive force prior to the splice element being actuated to grip said ends.

26. The splice of claim 24 wherein said fiber ends are originally placed in the splice element heated to a temperature above 80° C. prior to actuation of the splice element.

27. The splice of claim 24 wherein said splice element is stretched to elastically deform the splice element prior to actuation of the splice element.

28. The splice of claim 14 wherein the splice element is elastically deformed longitudinally of the fiber aligning passageway prior to actuation of the splice element to grip the fiber ends therein.

29. The splice of claim 24 wherein the splice element is subjected to plastic deformation after actuation to produce the axial compression on the fiber ends at the interface.

* * * * *